United States Patent
Sawayama et al.

(10) Patent No.: US 6,249,304 B1
(45) Date of Patent: Jun. 19, 2001

(54) IMAGE FORMING APPARATUS AND IMAGE FORMING METHOD FOR FORMING COLOR IMAGES BY GRAY-LEVEL IMAGE FORMING TECHNIQUE

(75) Inventors: Noboru Sawayama, Tokyo; Akio Kosuge; Atsushi Takehara, both of Kanagawa; Hiroshi Yoshimura, Tokyo; Katsuhiko Maeda, Kanagawa, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/269,750

(22) PCT Filed: Oct. 6, 1997

(86) PCT No.: PCT/JP97/03555

§ 371 Date: May 13, 1999

§ 102(e) Date: May 13, 1999

(87) PCT Pub. No.: WO98/15875

PCT Pub. Date: Apr. 16, 1998

(30) Foreign Application Priority Data

Oct. 8, 1996 (JP) .................................................. 8-266457
Sep. 3, 1997 (JP) .................................................. 9-238057

(51) Int. Cl.$^7$ .................................................. B41J 2/435
(52) U.S. Cl. .................................................. 347/228; 347/225
(58) Field of Search .................................. 347/228, 225, 347/183, 187, 193, 132; 430/31, 48, 49, 84

(56) References Cited

U.S. PATENT DOCUMENTS 5,172,132 * 12/1992 Haneda et al. ..................... 347/132
5,380,610 * 1/1995 Haneda et al. ..................... 430/31
5,834,145 * 11/1998 Yoshinaga et al. ................. 430/31

FOREIGN PATENT DOCUMENTS 56-83757   7/1981 (JP) .
56-165162  12/1981 (JP) .

* cited by examiner

*Primary Examiner*—N. Le
*Assistant Examiner*—Hai C. Pham
(74) *Attorney, Agent, or Firm*—Oblon, Spivak, McClelland, Maier & Neustadt, P.C.

(57) ABSTRACT

The present invention is aimed at carrying out high-precision and stable image formation using a gray-level image forming technique. In carrying out image formation by a gray-level electrophotographic process, the relationship between the layer thickness Tp of the photosensitive layer on the photosensitive member and the exposure diameter Db of a light beam emitted onto the photosensitive member is defined as 2Tp <Db, so that the charge diffusion and electric field in the photosensitive layer on the photosensitive member can be small. The maximum exposure within the exposure diameter Db is set at a value that can sufficiently reduce the differential sensitivity of the photosensitive layer, where the exposure diameter Db of the light beam is the minimum diameter at $1/e^2$ with respect to the peak value of the exposure distribution obtained by integrating the energy distribution of the light beam with the exposure time. In this manner, excellent gray-level image presentation can be obtained, and high-precision and stable image formation can be carried out by using a region of damping characteristics on the photosensitive member.

19 Claims, 4 Drawing Sheets

F I G . 2
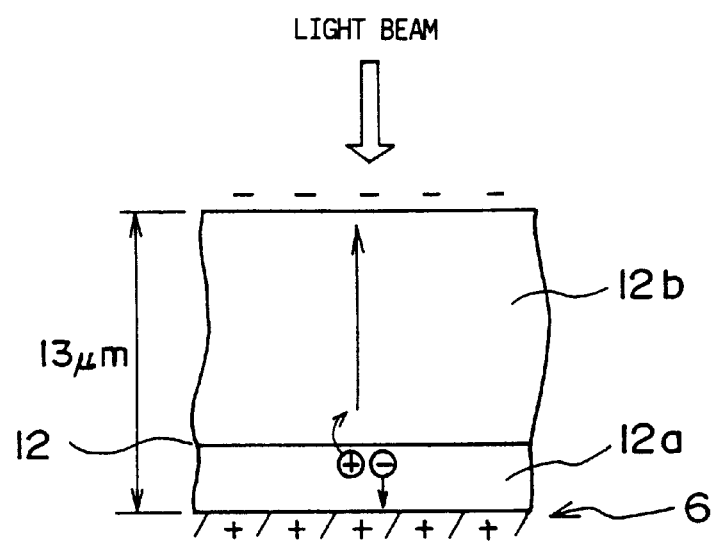
F I G . 3A      F I G . 3B
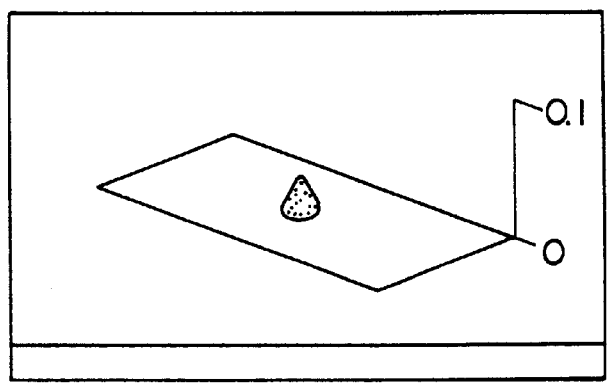
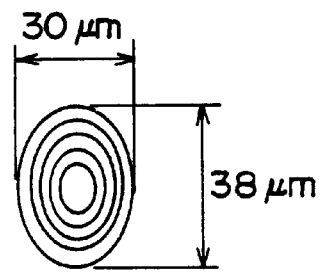

IMAGE FORMING APPARATUS AND IMAGE FORMING METHOD FOR FORMING COLOR IMAGES BY GRAY-LEVEL IMAGE FORMING TECHNIQUE

TECHNICAL FIELD

The present invention relates to an image forming apparatus and an image forming method suitable for forming color images by a gray-level image forming technique.

BACKGROUND ART

In recent years, there has been an increasing demand for high-precision reproducibility of image information by a digital copying machine or a printing machine which uses an electrophotographic technique. In response to this demand, methods and techniques for stabilizing image forming conditions or for realizing more precise gray-level image presentation have been developed.

Japanese Patent Application Laid-Open No. 1-297269 discloses a method in which the amount of light for black information recording by a light emitting device which forms an electrostatic latent image on a photosensitive member is set within the saturation range of the damping characteristics of the photosensitive member. Within the saturation range, the potential of the photosensitive member does not fluctuate greatly along with a fluctuation of the amount of light of the light emitting device. Thus, density unevenness due to a fluctuation of the amount of light emitted from the light emitting device can be prevented.

Japanese Patent Application Laid-Open NO. 4-25871 discloses a technique in which a high γ-photosensitive member is employed, and the relationship between the maximum light amount $I_0$ of the beam amount distribution on the high γ-photosensitive member and the half exposure light amount $P_{1/2}$ for reducing the potential of the photosensitive member by half is defined as: $1.2 \times P_{1/2} \leq I_0 \leq 2.5 \times P_{1/2}$. By satisfying the above conditions, clear image formation is carried out regardless of fluctuations in sensitivity of the photosensitive member.

Japanese Patent Application Laid-Open No. 8-160677 also discloses an image forming process called a simultaneous cleaning method or a cleanerless method, in which the exposure intensity in the exposure process is set in a predetermined range so that excellent image formation can be obtained, though residual toners on the photosensitive member are again charged and exposed. In this manner, ghost images can be prevented, and high-resolution and excellent gray-level images can be obtained.

In the above Japanese Patent Application Laid-Open Nos. 1-297269, 4-25871, and 8-160677, "saturation write" is carried out to irradiate the photosensitive member with light to form an electrostatic latent image, and the amount of light is in the saturation range of the photosensitive member. Thus, fluctuations in exposure amount and photosensitivity, and image deterioration caused by residual toners, can be reduced.

As described above, methods for stabilizing conditions of image formation by performing "saturation write" have been developed. A half-tone technique, which uses "saturation write", is also suitable for reducing density unevenness, called "banding", which is caused by small fluctuations of the write position in the sub-scan direction.

The above three Japanese Patent Application Laid-Open Nos. 1-297269, 4-25871, and 8-160677, however, do not specifically disclose means for carrying out high-precision and stable image formation when a large enough amount of light for performing "saturation write" is emitted to the photosensitive member. More specifically, enough consideration has not been given to the following: the relationship between the exposure diameter of the light beam and the layer thickness of the photosensitive member, the relationship between the maximum exposure and the differential sensitivity, and the relationship between the thickness of the photosensitivity and the light beam diameter of the write unit. These relationships should be taken into consideration when reducing charge diffusion and electric field expansion on the photosensitive layer so as to realize high precision in recorded images. Images formed by the conventional method described above are coarse, and for such images with low precision, it is not necessary to take into consideration the relationship between the thickness of the photosensitive layer and the light beam diameter.

The image formation using an electrophotographic technique is essentially an analog system, in which each dot can be easily multi-valued. By multi-valuing the output of a write unit (a laser diode, for instance), fine image formation can be carried out with each pixel having a gray-level. If a dot area modulation method, such as a dither method and an error diffusion method, is employed without multi-valuing each dot, obtained color images cannot be considered for practical use.

However, multi-valuing each dot in image formation using an electrophotographic technique results in deterioration of stability against various fluctuations. To solve such a problem, the following methods have been developed.

There is a method of pulse-width modulating an elliptical beam for improving gray-level reproducibility, especially reproducibility and stability in highlight images (disclosed in "A High Quality Color Printing Technology by Electrophotography" in Thesis Compilation Vol. J69-C No. 9 by the Institute of Electronics and Communication Engineers of Japan, 1986). By this pulse-width modulation method, gray-level presentation including density dot modulation and area dot modulation can be obtained, thus improving gray-level reproducibility.

As a technique for improving gray-level reproducibility, there is a method called HIEST, in which the number of lines in a specific direction depending on the gray level (disclosed in "New Halftone Screening Technology Focused on Highlight Image Reproduction", Japan Hardcopy, 1995). However, the pulse-width modulation method and the HIEST method are designed to improve stability against various fluctuations caused by multi-valuing in the electrophotographic process. In the case where the "saturation write" is performed to apply a large enough amount of light to the photosensitive member, those methods are not effective in carrying out high-precision and stable image formation.

DISCLOSURE OF THE INVENTION

An object of the present invention is to provide an image forming apparatus and an image forming method for carrying out high-precision and stable image formation. In the apparatus and method of the present invention, when a sufficient amount of light for carrying out "saturation write" is emitted onto the photosensitive member, the relationship between the exposure diameter and the thickness of the photosensitive layer, and the relationship between the maximum exposure and the differential sensitivity of the photosensitive member, are defined so as to restrict the charge diffusion and the electric field on the photosensitive layer.

The image forming apparatus of the present invention comprises: a photosensitive member having a photosensitive layer (thickness: Tp) on its surface; a charging unit for uniformly charging the surface of the photosensitive member; an image exposure unit for exposing the uniformly charged photosensitive member with a light beam so as to form an electrostatic latent image; a gray-level image device for transmitting a drive signal to the image exposure unit and presenting a gray-level image in accordance with a gray-level signal based on image data including gray-level information; a developing unit for developing an electrostatic latent image formed on the photosensitive member; and a transferring unit for transferring a developed image from the photosensitive member onto a recording medium. The relationship between the layer thickness Tp and the exposure diameter Db is defined as 2Tp<Db, where the exposure diameter Db of the light beam is the minimum diameter at $1/e^2$ with respect to the peak value of the exposure distribution determined by integrating the energy distribution of the light beam on the photosensitive member with the exposure time. The maximum exposure within the exposure diameter Db is set at a value that makes the differential sensitivity of the photosensitive layer small enough. More specifically, the maximum exposure within the exposure diameter Db is set at a value that reduces the differential sensitivity of the photosensitive layer to less than a third of its maximum value.

The "energy distribution of the light beam" indicates the energy distribution of the light beam emitted from the image exposure unit. The "exposure distribution" indicates the energy distribution of the light beam on the photosensitive member, and defined as:

$$E(x, y) = \int P(x, y, t) dt$$

where: (x, y) is surface coordinates on the photosensitive member; P(x, y, t) [watt/m$^2$] is the energy distribution of the light beam on the photosensitive member; and E(x, y) [jule/m$^2$] is the value obtained by integrating the energy distribution P(x, y, t) with respect to the exposure time. If the light beam is a laser beam, it scans the photosensitive member in the main-scan direction. In this case, the exposure time integrated with respect to the energy distribution of the light beam is the time of scanning in the main-scan direction. In the case of an LED beam which does not scan in the main-scan direction, the exposure time integrated with respect to the energy distribution of the light beam is the time of scanning in the sub-scan direction during the rotation of the photosensitive member. The "differential sensitivity" is defined with the relationship between the surface potential V(E) of the photosensitive member and the exposure E when the photosensitive member is uniformly exposed with a light beam having the same wavelength as the light beam emitted from the image exposure unit. More specifically, the differential sensitivity is defined as:

$$|V(E+dE) - V(E)|/dE$$

where: E is the amount of exposure light; dE is a small value added to the Exposure E; and V(E+dE) is the surface potential of the photosensitive member. In general, the differential sensitivity reduces as the exposure E increases. The "value that makes the differential sensitivity small enough" is the value of exposure that can utilize the range of the damping characteristics of the photosensitive member to obtain stability as well as excellent gray-level image presentation by the gray-level image device. The "stability to be obtained" is to prevent "banding". Specifically, the "value that makes the differential sensitivity small enough" is a value that reduces the differential sensitivity of the photosensitive layer to less than a third of its maximum value.

In the image forming apparatus of the present invention, the image exposure unit exposes the uniformly charged photosensitive member with a light beam so as to form an electrostatic latent image. Here, the maximum exposure within the exposure diameter Db is set at the value that makes the differential sensitivity of the photosensitive layer small enough, or at the value that reduces the differential sensitivity of the photosensitive layer to less than a third of its maximum value. Thus, high-quality image formation is carried out regardless of mechanical fluctuations. Also, as the relationship between the layer thickness Tp of the photosensitive layer and the exposure diameter Db is defined as 2Tp<Db, the charge diffusion and the electric field expansion on the photosensitive layer are restricted. This prevents adverse influence from various mechanical fluctuations, and a blur in an electrostatic latent image. In other words, according to the present invention, the diameter of the light beam spot is made small so as to obtain good gray-level image presentation, and the relationship between the layer thickness Tp of the photosensitive layer and the exposure diameter Db is set so as to prevent pixel expansion on the photosensitive layer of the photosensitive member. Also, the intensity of the light beam is set so that high-quality image formation can be carried out regardless of various mechanical fluctuations. Thus, according to the present invention, high-precision and stable image formation can be carried out, while maintaining excellent gray-level image presentation.

The maximum exposure within the exposure diameter Db, which is the value that makes the differential sensitivity of the photosensitive layer small enough or that reduces the differential sensitivity of the photosensitive layer to less than a third of its maximum value, can be in a range in which the photosensitive member has not reached the saturation range. In view of this, the gray-level image device can presents gray-level images by not only a dot area modulation method but also a dot density modulation method. Furthermore, as the relationship between the layer thickness Tp of the photosensitive layer and the exposure diameter Db is defined as 2Tp<Db, charge diffusion and electric field expansion on the photosensitive layer can be restricted so as to obtain fine dots. In this manner, precise gray-level image representation can be achieved by the dot area modulation method. Thus, the "value that makes the differential sensitivity small enough", i.e., the "the value of exposure that can utilize the range of the damping characteristics of the photosensitive member to obtain stability as well as excellent gray-level image presentation by the gray-level image device", can be readily set in the present invention.

The above and other objects and features of the present invention will become apparent from the following description taken in conjunction with the accompanying drawings.

BRIEF DESCRIPTION OF THE DRAWINGS

FIG. 2 is a sectional view of the photosensitive layer of a photosensitive member;

FIGS. 3A and 3B are graphs showing the energy distribution (beam profile) of a light beam;

BEST MODE FOR CARRYING OUT THE INVENTION

The following is a description of preferred embodiments of the present invention, with reference to the accompanying drawings.

Figure 1:
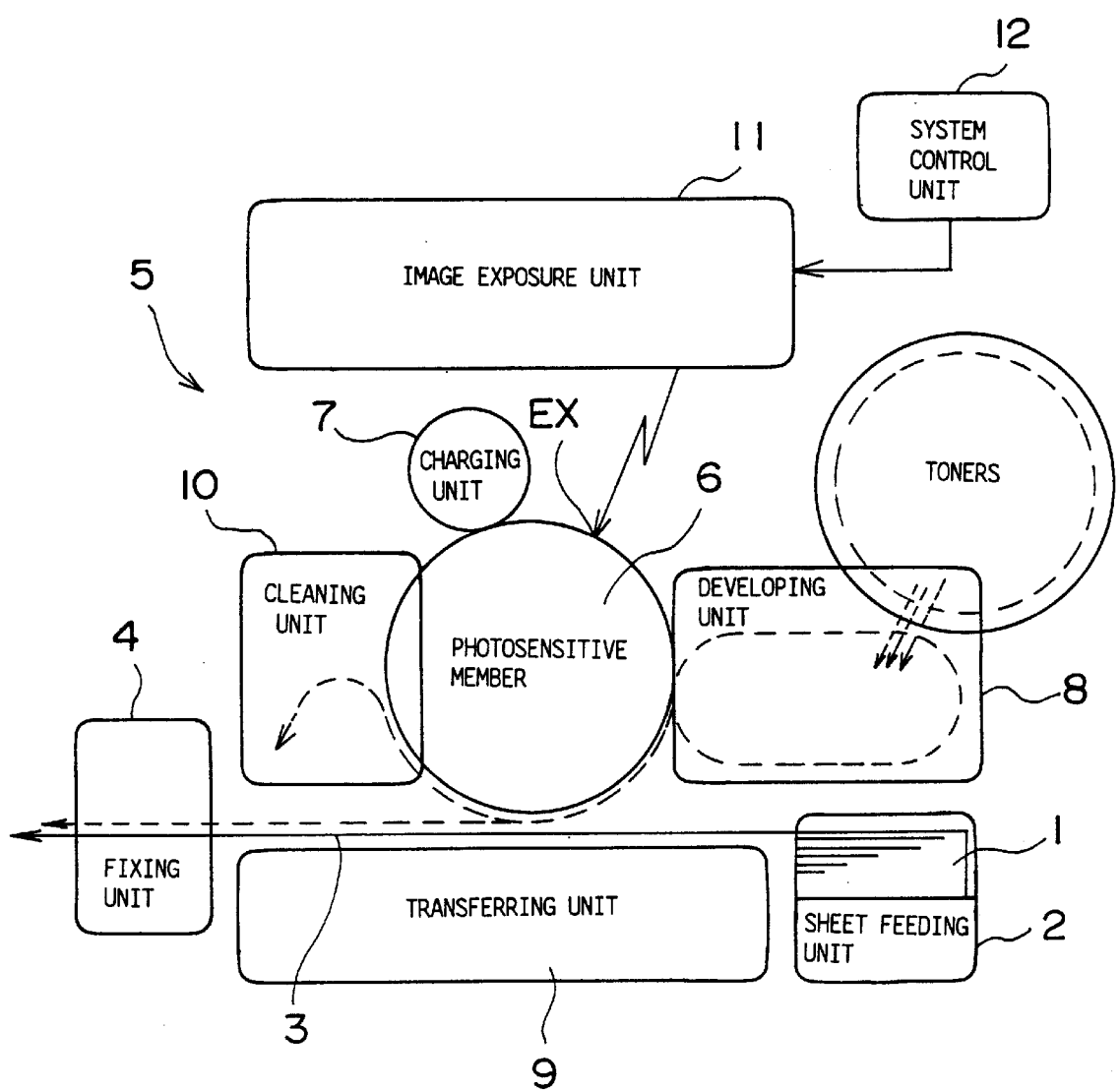
FIG. 1 is a schematic view of an image forming apparatus of the first embodiment of the present invention.

FIG. 1 is a schematic view of an image forming apparatus. As shown in FIG. 1, the image forming apparatus comprises a sheet feeding unit 2 containing transfer sheets 1 as a recording medium, a sheet transporting path 3 communicating with a sheet discharging unit (not shown), and an image processing unit 5 including a fixing unit 4 in the sheet transporting path 3.

The image processing unit 5 is formed around a photosensitive member 6 in the form of a photosensitive drum. The photosensitive member 6 is surrounded by a charging unit 7, a developing unit 8, a transferring unit 9, and a cleaning unit 10, in that order. An exposure point EX is situated between the charging unit 7 and the developing unit 8, and the image processing unit 5 is provided with an image exposure unit 11 for irradiating the exposure point EX with a light beam that is a laser beam. In the image processing unit 5, the charging unit 7 applies electric charges to the photosensitive member 6 by corona electric charging, so that the photosensitive member 6 is uniformly charged with one polarity. With the photosensitive member 6 being uniformly charged at the exposure point EX by the charging unit 7, the image exposure unit 11 irradiates the exposure point EX with a light beam in accordance with image information, so as to form an electrostatic latent image on the photosensitive member 6. In other words, a potential difference occurs in the irradiated area on the photosensitive member 6, and the irradiated area forms the electrostatic latent image. The developing unit 8 applies toners of the reverse polarity to the electrostatic latent image formed at the exposure point EX on the photosensitive member 6, thereby developing an image. The transferring unit 9 picks up the toner image developed on the photosensitive member 6 with the electric potential of reverse polarity, and then transfers the toner image onto a transfer sheet 1. The sheet transporting path 3 has a transporting structure for transporting the transfer sheet 1. The cleaning unit 10 cleans the photosensitive member 6 by scraping residual toners off the photosensitive member 6 after the transferring process. The fixing unit 4 is disposed on the downstream side of the transferring unit 9 in the sheet transporting path 3, and fixes the non-fixed toners adhering to the transfer sheet 1 by heating and pressurizing them after the transfer sheet 1 has passed through the transferring unit 9.

The image forming apparatus of this embodiment further comprises a system control unit 12 having a structure of a microcomputer for controlling the other units. The system control unit 12 consists of a CPU for controlling the other units by executing various operations, a ROM for storing fixed data, and a RAM for storing variable data and used as a work area (none of them is shown in the figure). The system control unit 12 is connected to an image memory, for instance, which develops and holds the drive control circuit and image information of each of the other units (none of them is shown in the figure). The system control unit 12 controls the drive of each unit, thereby forming an image by an electrophotographic process. In particular, the image exposure unit 11 is controlled by an image signal and a control signal outputted from the system control unit 12, so that it irradiates the exposure point EX on the photosensitive member 6 with a light beam in accordance with the image information.

The image forming apparatus of this embodiment is provided with a gray-level image device to be operated by the microcomputer of the system control unit 12. The gray-level image device controls the drive of the image exposure unit 11 based on image data including gray-level information. More specifically, the gray-level image device is operated by a known gray-level image presenting method such as an error diffusion method and a dither method.

FIG. 2 is a sectional view of a photosensitive layer 12 of the photosensitive member 6. The photosensitive member 6 is an organic photosensitive member. The photosensitive layer 12 of the photosensitive member 6 is made up of a charge generation layer 12a disposed on the base side of the photosensitive member 6 and a charge transportation layer 12b disposed on the surface side. The layer thickness Tp of the photosensitive layer 12 is 13 $\mu$m. The relationship between the layer thickness Tp of the photosensitive layer 12 and the exposure diameter Db of the light beam is expressed as:

$$2Tp < Db < 8Tp$$

The exposure diameter Db of the light beam can be defined as the minimum diameter, which is equivalent to the distance between the peak of the exposure distributions E (x, y) and $1/e^2$. The exposure distribution E (x, y) [jule/m$^2$] is defined as:

$$E(x, y) = \int P(x, y, t) dt$$

which is the value obtained by integrating the energy distribution P (x, y, t) [watt/m$^2$] of the light beam on the photosensitive member 6 with respect to the exposure time, where (x, y) is surface coordinates of the photosensitive member 6.

Figures 4A, 4B:
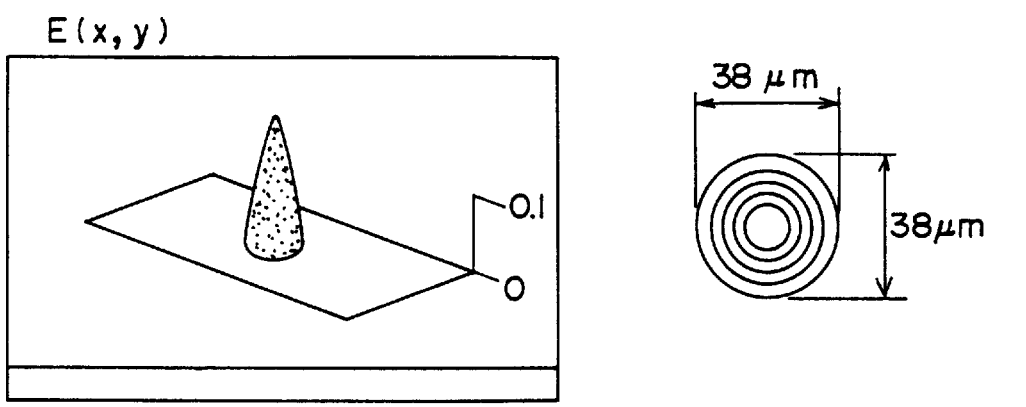
FIGS. 4A and 4B are graphs showing the exposure distribution.

FIG. 3A is a graph showing the energy distribution (beam profile) of the light beam irradiating the photosensitive member 6. FIG. 4A is a graph showing the exposure distribution on the photosensitive member 6. In the beam profile of this embodiment, the diameter of the light beam at $1/e^2$ with respect to the peak of the exposure distribution is 30 $\mu$m in a main-scan direction, and 38 $\mu$m in a sub-scan direction (see FIG. 3B). Accordingly, the energy distribution of the light beam represents the Gaussian distribution of 30 $\mu$m in the main-scan direction and 38 $\mu$m in the sub-scan direction. If 20 $\mu$m of the photosensitive member 6 is exposed in the sub-scan direction so as to form an electrostatic latent image of one pixel on the photosensitive member 6, the exposure diameter of the light beam in the exposure distribution is 38 $\mu$m both in the main-scan direction and the sub-scan direction (see FIG. 4B). The Gaussian distribution is approximately 38 $\mu$m both in the main-scan direction and the sub-scan direction. Accordingly, the exposure diameter Db of the light beam defined as the minimum diameter at $1/e^2$ with respect to the peak of the exposure distribution is 38 $\mu$m.

Figure 5:
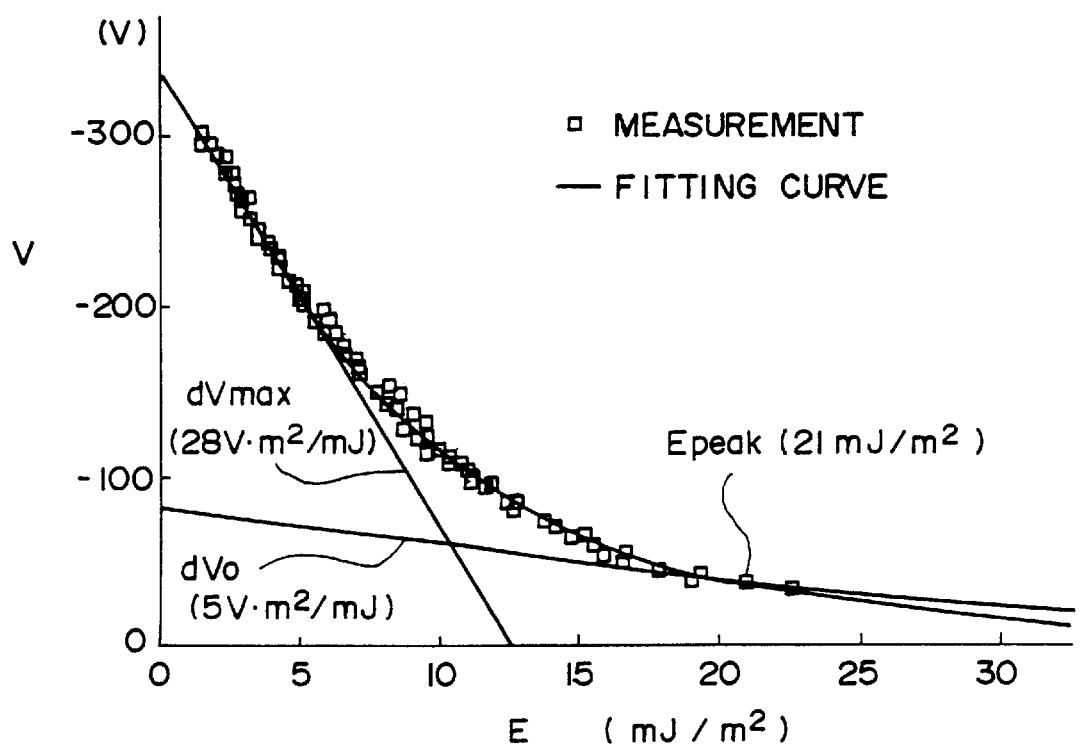
FIG. 5 is a graph showing the damping characteristics of the surface potential of the photosensitive member with respect to the exposure.

FIG. 5 is a graph showing damping characteristics of the surface potential V of the photosensitive member 6 with respect to the exposure E. The image exposure unit 11 of this embodiment emits a light beam having a wavelength of 670 nm, and its exposure power is adjusted to 0.23 mW on the surface of the photosensitive member 6. By this, the exposure at the peak of the exposure distribution, i.e., the maximum exposure within the exposure diameter Db, can be a value which makes the differential sensitivity of the photosensitive layer 12 small enough. The "differential sensitivity" can be defined as the relationship between the surface potential V(E) of the photosensitive member 6 and the exposure E when the photosensitive member 6 is uniformly exposed to a light beam having the same wavelength as that of the light beam (670 nm) emitted from the image exposure unit 11. More specifically, if the photosensitive member 6 is exposed with an exposure E, the differential sensitivity dV is defined as:

$$DV=|V(E+dE)-V(E)|/dE$$

where V(E+dE) is the surface potential of the photosensitive member 6 when the exposure E is increased by dE. The "value that makes the differential sensitivity small enough" refers to the value of the exposure E that can produce gray-level images by the gray-level image device by virtue of the damping characteristics of the photosensitive member to obtain high-precision and stable images. The "value that makes the differential sensitivity small enough" is, for instance, a value to lower the differential sensitivity of the photosensitive layer 12 to a third of its maximum value or even less. In accordance with the damping characteristics of the photosensitive member 6 shown in FIG. 5, the maximum differential sensitivity (dVmax) is 28 V·m²/mJ, and the exposure E corresponding to a differential sensitivity which is a third of its maximum value or less is the value that makes the differential sensitivity small enough. In FIG. 5, for instance, the peak exposure Epeak at the peak of the exposure distribution is 21 mL/m², and the corresponding differential sensitivity dVo is 5 V·m²/mJ. This is approximately a fifth of the maximum differential sensitivity.

In this structure, the charging unit 7 charges the photosensitive layer 12 on the photosensitive member 6, and an electrostatic latent image is formed at the exposure point EX on the charged photosensitive member 6 based on the image information. Here, the gray-level image device reproduces the gray-level in accordance with the gray-level information included in the image data. Toners supplied from the developing unit 8 are applied to the electrostatic latent image, thereby developing the image. The developed image, i.e., the toner image, is then transferred onto a transfer sheet 1 transported to the electrophotographic processing unit 5 at a predetermined pace. The fixing unit 4 fixes the transferred image, thereby completing the image formation on the transfer sheet 1. After the transferring process, the cleaning unit 10 cleans the photosensitive member 6 to remove the residual toners.

In the exposure process of the photosensitive member 6, when the image exposure unit 11 exposes the uniformly charged photosensitive member 6 with a light beam to form an electrostatic latent image, the maximum exposure within the exposure diameter Db of the light beam is set at a value that makes the differential sensitivity of the photosensitive layer 12 small enough. Thus, high-quality image formation can be performed without being adversely affected by mechanical vibration and others. In the damping characteristics of the photosensitive body 6 shown in FIG. 5, exposure is performed in the area where the differential sensitivity is small. Because of this, a fluctuation in the surface potential of the photosensitive member 6 caused by a fluctuation of the exposure E is small. Even if the exposure E fluctuates due to mechanical vibration or operational instability in the components, the fluctuation in the surface potential of the photosensitive member 6 is small, and high-precision and stable image formation can be carried out. Moreover, as the relationship between the thickness Tp of the photosensitive layer 12 and the exposure diameter Db is 2Tp<Db, the charge diffusion and electric field on the photosensitive layer 12 of the photosensitive member 6 are small. This prevents adverse influence from mechanical vibration or fluctuations, and a blur of an electrostatic latent image can be avoided. Thus, high-precision and stable image formation can be performed with excellent gray-level image presentation.

The value of the maximum exposure within the exposure diameter Db that makes the differential sensitivity of the photosensitive layer small enough is a value of the exposure that can utilize the damping characteristics of the photosensitive member 6 enough to obtain stability while producing a gray-level image. More specifically, the maximum exposure of this value lowers the differential sensitivity of the photosensitive layer 12 to a third of its maximum value. If the photosensitive member 6 is exposed with the exposure of this value, the exposed area of the photosensitive member 6 includes an area which is not completely saturable. Therefore, the gray-level image device can be operated not only by a dot area modulation method but also by a dot density modulation method. As the relationship between the thickness Tp of the photosensitive layer 12 and the exposure diameter Db is defined as 2Tp<Db, the charge diffusion and the electric field on the photosensitive layer of the photosensitive member are so small that the dots become fine. Thus, an excellent gray-level image can be produced by the dot area modulation method.

Compared with an inorganic photosensitive member, the photosensitive member 6, which is an organic photosensitive member, has a poor mechanical strength, and is often subjected to abrasion by the cleaning unit 10. As the relationship between the layer thickness Tp of the photosensitive layer 12 and the exposure diameter Db of the light beam is defined as 8 Tp>Db in this embodiment, the layer thickness Tp of the photosensitive layer 12 does not become too thin. Thus, the life of the photosensitive member 6 can be prolonged, while the charge diffusion and the electric field on the photosensitive layer are restricted so as not to obstruct practical use.

The exposure diameter Db of the light beam in this embodiment is 38 μm. So, even if a sufficient light energy is given to the photosensitive member 6, the diameter of each pixel actually formed on the transfer sheet 1 is in the range of 50 to 70 μm, which is the resolution of the eye in the range of clear vision (25 to 30 cm). Thus, high-quality image formation is carried out.

As a modification of the first embodiment, image formation may be performed by a positive development method. More specifically, the charging unit 7 uniformly charges the photosensitive member 6 with the polarity reverse to the toners contained in the developing unit 8, and an electrostatic latent image is formed in the non-exposed area by the image exposure unit 11. The developing unit 8 then applies toners to the electrostatic latent image. Here, the maximum exposure within the exposure diameter Db is set at the value that makes the differential sensitivity of the photosensitive layer 12, and the dots in the electrostatic latent image in the formed non-exposed area are fine. Thus, fine image formation can be performed. As the non-exposed area becomes a solid portion, the image density in the non-exposed portion is high enough. When performing image formation by the positive development method, the charging unit 7 positively charges the surface of the photosensitive member 6 by utilizing the corona discharge of the charging unit 7. By doing so, the photosensitive member 6 is more steadily charged. Furthermore, negative toners, which are widely used, can be used in this embodiment.

The error diffusion method and the dither method have been mentioned above as examples of the gray-tone level image presenting method using the gray-level image device, but the dot area modulation method as well as the dot density modulation method can also be employed.

The following is a description of a second embodiment of the present invention. Like components are indicated by like reference numerals in this embodiment and the first embodiment (This also applies to a third embodiment). In this embodiment, an inorganic photosensitive member made of amorphous silicon is used for the photosensitive member 6. The charging unit 7 positively charges the photosensitive member 6, for instance, at +550 V. The image exposure unit 11 forms an electrostatic latent image by exposing the surface of the photosensitive member 6 with a light beam having a light energy more than twice larger than the light energy that can cause the surface potential of the uniformly charged photosensitive member 6 to damp to a half of its potential. The electric potential in the exposed area on the photosensitive member 6 is +50 V, for instance. The developing unit 8 contains negative toners, and is biased at +200 V to develop an electrostatic latent image formed on the photosensitive member 6 by a positive development method. The charging unit 7 uniformly charges the photosensitive member 6 with positive polarity (at +550 V, for instance), which is the reverse polarity to the toners contained in the developing unit 8. The uniformly charged photosensitive member 6 is them exposed by the image exposure unit 11, so that an electrostatic latent image of +550 V is formed in the non-exposed area where the potential drops to +50 V. The electrostatic latent image has the polarity reverse to the toners contained in the developing unit 8, and the potential difference is large. When the electrostatic latent image passes through the developing unit 8, the toners adhere to the electrostatic latent image. The transferring unit 9 then transfers the toner image onto a transfer sheet 1, thereby completing image formation on the transfer sheet 1.

The image exposure unit 11 forms an electrostatic latent image by exposing the surface of the photosensitive member 6 with a light beam having a light energy more than twice larger than a light energy which can cause the surface potential of the uniformly charged photosensitive member 6 to a half of its potential. The exposure is carried out in the saturation range or in the neighborhood of the saturation range of the photosensitive member 6. The electrostatic latent image thus formed is developed by the positive development method. Accordingly, the combination of the positive development method and the exposure within the neighborhood of the saturation range of the photosensitive member 6 further improves the fineness of the dots. Thus, fine image formation can be performed. As the non-exposed area forms a solid image, the image density in the non-exposed area is high enough. Since the exposure is carried out in the saturation range or in the neighborhood of the saturation range of the photosensitive member 6, adverse influence of mechanical fluctuations can be avoided, and high-precision and stable image formation can be carried out.

The image exposure unit 11 forms an electrostatic image by exposing the surface of the photosensitive member 6 with a light beam having a light energy more than twice larger than the light energy that can cause the surface potential of the uniformly charged photosensitive member 6 to damp to a half of its potential. The photosensitive member 6 is exposed in the neighborhood of the saturation range. Here, a dot density modulation method may be employed, as well as a dot area modulation method, to produce a gray-level image. The combination of the positive development method and the exposure in the neighborhood of the saturation range of the photosensitive member 6 further improves the fineness of the dots. This enables fine gray-level image formation by the dot area modulation method. Thus, high-precision and stable image formation can be carried out, while fine gray-level image presentation is maintained.

The charging unit 7 positively charges the surface of the photosensitive member 6. If the charging unit 7 is of a type that utilizes corona discharge, the photosensitive member 6 can be more stably charged. Negative toners that are widely used can be used too.

Since an inorganic photosensitive member made of amorphous silicon is used for the photosensitive member 6, the life of the photosensitive member 6 is prolonged, and its security is improved.

Figure 6:
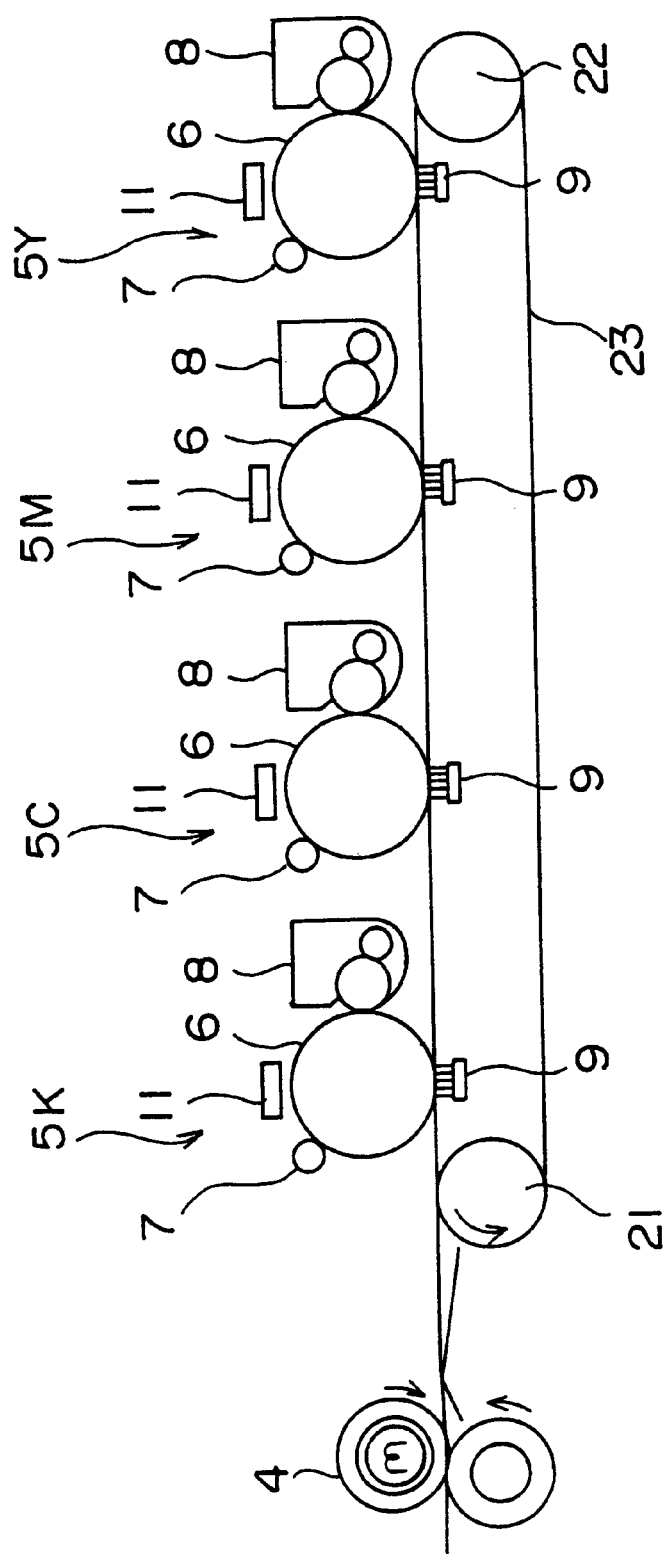
FIG. 6 is a schematic view of a color image forming apparatus of the third embodiment of the present invention.

The following is a description of the third embodiment of the present invention, with reference to FIG. 6. This embodiment is an example of the present invention applied to a tandem-type color image forming apparatus. Image processing units 5Y, 5M, 5C, and 5K for yellow, magenta, cyan, and black, respectively, are arranged in that order from the upstream side on a transportation belt 23 stretched over a drive roller 21 and a follow roller 22. For those image processing units 5Y, 5M, 5C, and 5K, the image processing unit 5 of the first and second embodiments is employed if appropriate. In the color image processing apparatus of this embodiment, a transfer sheet 1 fed from a feeding unit 2 (not shown in FIG. 6) onto the transportation belt 23 is transported through the image processing units 5Y, 5M, 5C, and 5K, for yellow, magenta, cyan, and black, in that order, so that a color image is transferred into the transfer sheet 1. The transferred color image is then fixed to the transfer sheet 1 by heat and pressure from the fixing device 4.

With the image processing unit 5 of the first and second embodiments, high-precision and stable image formation, fine dots, and precise gray-level images can be obtained. Such features of the image processing unit 5 are advantageous in the color image apparatus to form high-quality color images.

The following two examples demonstrate that the image forming apparatus and method of the present invention is effective in improving fineness and stability of images. The machine used in the examples is substantially the same as in the above embodiments. Accordingly, like components are indicated by like reference numerals in the following two examples and the above embodiments.

EXAMPLE 1

The diameter of the photosensitive member 6 is 100 mm, and the layer thickness Tp of the photosensitive layer 12 is 13 $\mu$m. The light damping characteristics with respect to a light of 670 nm are as shown in the graph of FIG. 5. The maximum differential sensitivity is 28 V·m$^2$/mJ. This photosensitive member 6 is rotated at a peripheral speed (process speed) of 20 mm/sec.

The charging unit 7 charges the photosensitive member 6 at −340 V.

The developing unit 8 uses a developer, which is a 5 wt % mixture of silicon ferrite carriers of 50 $\mu$m in mean particle size and toners of 7 $\mu$m in mean particle size. The mean charge amount of the toners measured by a blowoff device is −20 pc/g. The developing unit 8 develops an image by rotating a developing sleeve, to which a bias voltage of −200 V is applied, at a periphery speed of 40 mm/sec.

The light beam emitted from the image exposure unit 11 is 670 nm in wavelength as in the embodiments of the present invention, and the exposure power on the surface of the photosensitive member 6 is adjusted at 0.23 mW. The exposure diameter Db is adjusted so that the Gaussian distribution indicates 30 μm in the main-scan direction and 38 μm in the sub-scan direction, as shown in FIG. 3B. A polygonal mirror having eight planes is employed and rotated at 7200 rpm. The surface of the photosensitive member 6 is then scanned by the light beam at 530 m/sec. In this manner, the image exposure unit 11 exposes the photosensitive member 6 by 40 nsec (approximately 20 μm in length on the photosensitive member 6). Here, the Gaussian distribution indicates concentric circles of 38 μm both in the main-scan direction and the sub-scan direction. Accordingly, the exposure diameter Db is 38 μm, as shown in FIG. 4B.

The peak value in the exposure distribution, i.e., the peak exposure, is 21 mJ/m$^2$. With peak exposure at this value, the differential sensitivity indicates 5 V·m$^2$/mJ, which is a fifth of the value of the maximum differential sensitivity or smaller. Here, the surface potential of the photosensitive member 6 is −40 V. The mean particle size of the toners in a toner image formed on the surface of the photosensitive member 6 is 37 μm, and its standard deviation is 5 μm. This means that uniform pixels are obtained. Even if the charge potential, the development bias, and the exposure amount are changed by 30% each, the uniformity in the pixels is maintained. Thus, the apparatus in this example can perform high-precision and stable image formation.

EXAMPLE 2

The diameter of the photosensitive member 6 is 120 mm, and the layer thickness Tp of the photosensitive layer 12 is 17 μm. The light damping characteristics with respect to a light of 670 nm are as shown in the graph of FIG. 5. The maximum differential sensitivity is 50 V·m$^2$/mJ. This photosensitive member 6 is rotated at a peripheral speed (process speed) of 180 mm/sec.

The charging unit 7 charges the photosensitive member 6 at −500 V.

The developing unit 8 uses a developer, which is a 5 wt % mixture of silicon ferrite carriers of 50 μm in mean particle size and toners of 7 μm in mean particle size. The mean charge amount of the toners measured by a blowoff device is −20 pc/g. The developing unit 8 develops an image by rotating a developing sleeve, to which a bias voltage of −200 V is applied, at a periphery speed of 40 mm/sec.

The light beam emitted from the image exposure unit 11 is 670 nm in wavelength as in the embodiments of the present invention, and the exposure power on the surface of the photosensitive member 6 is adjusted at 1.63 mW. The exposure diameter Db is adjusted so that the Gaussian distribution indicates 55 μm in the main-scan direction and 85 μm in the sub-scan direction, as shown in FIG. 3B. A polygonal mirror having eight planes is employed and rotated at 21260 rpm. The surface of the photosensitive member 6 is then scanned by the light beam at 870 m/sec. In this manner, the image exposure unit 11 exposes the photosensitive member 6 by 55 nsec (approximately 50 μm in length on the photosensitive member 6). Here, the Gaussian distribution indicates concentric circles of 80 pm both in the main-scan direction and the sub-scan direction. Accordingly, the exposure diameter Db is 80 μm, as shown in FIG. 4B.

The peak value in the exposure distribution, i.e., the peak exposure, is 21 mJ/m$^2$. With peak exposure at this value, the differential sensitivity sufficiently drops to 5 V·m$^2$/mJ. Here, the surface potential of the photosensitive member 6 is −50 V. The mean particle size of the toners in a toner image formed on the surface of the photosensitive member 6 is 60 μm, and its standard deviation is 5 μm. This means that uniform pixels are obtained. Even if the charge potential, the development bias, and the exposure amount are changed by 20% each, the uniformity in the pixels is maintained. Thus, the apparatus in this example can perform high-precision and stable image formation.

As described so far, in the image forming 5 apparatus and the image forming method of the present invention, the relationship between the layer thickness Tp of the photosensitive layer on the photosensitive member and the exposure diameter Db of the light beam irradiating the photosensitive member is defined as 2Tp<Db, so that the charge diffusion and electric field in the photosensitive layer on the photosensitive member can be reduced. Thus, high-quality image formation can be carried out regardless of mechanical fluctuations of the components, and a blurred latent image can be avoided. The maximum exposure within the exposure diameter Db is set at a value that can sufficiently reduce the differential sensitivity of the photosensitive layer, or at a value that can reduce the differential sensitivity to a third of its maximum value or smaller. Thus, high-quality image formation can be carried out regardless of mechanical fluctuations. In this manner, high-precision and stable image formation is performed, and excellent gray-level images are produced.

In the image forming apparatus of the present invention, an organic photosensitive member having a photosensitive layer made of an organic substance is used for the photosensitive member. Here, the relationship between the layer thickness Tp of the photosensitive layer and the exposure diameter of the light beam is defined as 8Tp >Db. Accordingly, although the organic photosensitive member is poor in methcanical strength, the layer thickness Tp of the photosensitive layer 12 does not become too thin. Thus, the life of the photosensitive member 6 can be prolonged, while the charge diffusion and the electric field on the photosensitive layer are restricted so as not to obstruct practical use.

In the image forming apparatus of the present invention, the exposure diameter Db of the light beam is 30 to 50 μm. The resolution of the eye is 50 to 70 μm in the range of clear vision (25 to 30 cm). In view of this, the exposure diameter in the electrophotographic process is set at 30 to 50 μm, so that the pixel size in an electrostatic latent image on the photosensitive member is 40 to 60 μm even if a sufficient light energy is given to the photosensitive member 6. The diameter of each pixel actually formed on the transfer sheet 1 is 50 to 70 μm, which is the resolution of the eye in the range of clear vision (25 to 30 cm). Thus, high-quality image formation can be carried out.

In the image forming apparatus of the present invention, the developing unit develops an electrostatic latent image by a positive development method. The charging unit uniformly charges the photosensitive member with the polarity reverse to the polarity of the charged toners contained in the developing unit. The exposure unit exposes the photosensitive member so as to form an electrostatic latent image in the non-exposed area. The toners adhere to the electrostatic latent image, i.e., the non-exposed area on the photosensitive member, to form an image. In this image forming apparatus of the present invention, the maximum exposure in the neighborhood of the saturation range, i.e., the maximum exposure within the exposure diameter Db, is set at a value that makes the differential sensitivity of the photosensitive layer small enough, for instance, a third of its maximum value or smaller. This often causes dots to grow in size in the exposed area. By the positive development method, however, the dots can be reduced in size, because an electrostatic latent image is formed in the non-exposed area. Thus, fine image formation is carried out. Also, as the non-exposed area is a solid portion, the image density in the non-exposed area is high.

In the image forming apparatus of the present invention, the charging unit positively charges the surface of the photosensitive member. A charging unit that utilizes corona discharge charges the photosensitive member even more stably. Also, negative toners, which are widely used, can be employed.

The image forming apparatus of the present invention comprises: the photosensitive member having the photosensitive layer on its surface; the charging unit for uniformly charging the surface of the photosensitive member; the image exposure unit for exposing the photosensitive member with a light beam having a light energy more than twice larger than the light energy that reduces the surface potential of the uniformly charged photosensitive member to a half of its potential; the developing unit for developing an electrostatic latent image formed on the photosensitive member by a positive development method; and the transferring unit for transferring a developed image from a photosensitive member onto a recording medium.

In this image forming apparatus, the charging unit uniformly charges the photosensitive member with the reverse polarity to the polarity of the charged toners contained in the developing unit. The exposure unit exposes the photosensitive member to form an electrostatic latent image in the non-exposed area. The toners adhere to the electrostatic latent image to form an image. Here, the image exposure unit exposes the photosensitive member with a light beam having a light energy more than twice larger than the light energy that reduces the surface potential of the uniformly charged photosensitive member to a half of its potential. The exposure is carried out in the saturation range or in the neighborhood of the saturation range of the photosensitive member. This often causes the dots to grow in size in the exposed area. By the positive development method, however, an electrostatic latent image is formed in the non-exposed area, and the exposure is carried out within the neighborhood of the saturation area. In this manner, the dots can be reduced in size. Thus, fine image formation is carried out. Also, as the non-exposed area is a solid portion, the image density in the non-exposed area is high enough. Since the exposure is carried out in the saturation range or in the neighborhood of the saturation range on the photosensitive member, high-precision and stable image formation is carried out regardless of mechanical fluctuations.

In the image forming apparatus of the present invention, the charging unit positively charges the surface of the photosensitive member. A charging unit that utilizes corona discharge can charge the photosensitive member in a more stable manner. Also, negative toners, which are widely used, can be employed.

In the image forming apparatus of the present invention, an inorganic photosensitive member made of amorphous silicon is used for the photosensitive member. Thus, the life of the photosensitive member is prolonged, and its security is improved.

The image forming apparatus of the present invention comprises a gray-level image device which transmits a drive signal to the image exposure unit, and presents a gray-level image in accordance with a gray-level signal based on image data having gray-level information. In this image forming apparatus, an electrostatic latent image is formed by exposing the photosensitive member with a light beam more than twice larger than the light energy that can reduce the surface potential of the uniformly charged photosensitive member to a half of its potential. Here, the photosensitive member is exposed in a region which has not reached the saturation range, and the gray-level image device can be operated not only by a dot area modulation method but also by a dot density modulation method. Also, the combination of the positive development method for developing an electrostatic image formed in the non-exposed area and the exposure in the saturation range or in the neighborhood of the saturation range of the photosensitive member helps to obtain fine dots. Thus, fine gray-level image presentation is possible by the dot area modulation method.

In the image forming apparatus of the present invention, a color image is formed with at least three colors: yellow, magenta, and cyan. High-precision and stable image formation, the fineness of the dots, and excellent gray-level presentation are all even more advantageous in color image formation.

It should be noted that the present invention is not limited to the above embodiment, and various changes and modifications can be made unless otherwise they depart from the scope of the invention.

What is claimed is:

1. An image forming apparatus which comprises:
   a photosensitive member comprising a photosensitive layer of Tp thickness on a surface thereof;
   a charging unit configured to uniformly charge the surface of the photosensitive member;
   an image exposure unit configured to form an electrostatic latent image by exposing the photosensitive member with a light beam;
   a gray-level image device configured to transmit a drive signal to the image exposure unit, and to produce a gray-level image in accordance with a gray-level image signal based on image data including gray-level information;
   a developing unit configured to develop an electrostatic latent image formed on the photosensitive member; and
   a transfer unit configured to transfer a developed image from the photosensitive member to a recording medium;
   wherein a relationship between the thickness Tp of the photosensitive layer on the photosensitive member and an exposure diameter Db of the light beam is defined as $2Tp < Db$, where the exposure diameter Db is a minimum diameter at $1/e^2$ with respect to a peak value in an exposure distribution determined by integrating an energy distribution of the light beam on the photosensitive member with an exposure time, and
   the image exposure unit is configured to set a maximum exposure within the exposure diameter Db of the light beam at a value such that a differential sensitivity of the photosensitive layer of the photosensitive member is sufficiently small in order that the gray-level image will be produced as a result of damping characteristics of the photosensitive member.

2. The image forming apparatus according to claim 1, wherein the photosensitive member is an organic photosensitive member comprising the photosensitive layer made of an organic substance, and the relationship between the thickness Tp of the photosensitive layer and the exposure diameter Db of the light beam is defined as $8Tp > Db$.

3. The image forming apparatus according to claim 1, wherein the exposure diameter Db of the light beam emitted onto the photosensitive member by the image exposure unit is 30 µm to 50 µm.

4. The image forming apparatus according to claim 1, wherein the developing unit develops an electrostatic latent image by a positive development process.

5. The image forming apparatus according to claim 4, wherein the charging unit positively charges the surface of the photosensitive member.

6. The image forming apparatus according to claim 1, wherein the developing unit is configured to form a color image using at least one of yellow, magenta, and cyan.

7. An image forming apparatus which comprises:
  a photosensitive member comprising a photosensitive layer of Tp thickness on a surface thereof;
  a charging unit configured to uniformly charge the surface of the photosensitive member;
  an image exposure unit configured to form an electrostatic latent image by exposing the photosensitive member with a light beam;
  a gray-level image device configured to transmit a drive signal to the image exposure unit, and to produce a gray-level image in accordance with a gray-level image signal based on image data including gray-level information;
  a developing unit configured to develop an electrostatic latent image formed on the photosensitive member; and
  a transfer unit configured to transfer a developed image from the photosensitive member to a recording medium;
  wherein a relationship between the thickness Tp of the photosensitive layer on the photosensitive member and an exposure diameter Db of the light beam is defined as $2Tp < Db$, where the exposure diameter Db is a minimum diameter at $1/e^2$ with respect to a peak value in an exposure distribution determined by integrating an energy distribution of the light beam on the photosensitive member with an exposure time, and
  the image exposure unit is configured to set a maximum exposure within the exposure diameter Db of the light beam at a value that makes a differential sensitivity of the photosensitive layer of the photosensitive member a third of a maximum value of the differential sensitivity or smaller.

8. The image forming apparatus according to claim 7, wherein the photosensitive member is an organic photosensitive member comprising the photosensitive layer made of an organic substance, and the relationship between the thickness Tp of the photosensitive layer and the exposure diameter Db of the light beam is defined as $8Tp > Db$.

9. The image forming apparatus according to claim 7, wherein the exposure diameter Db of the light beam emitted onto the photosensitive member by the image exposure unit is 30 µm to 50 µm.

10. The image forming apparatus according to claim 7, wherein the developing unit develops an electrostatic latent image by a positive development process.

11. The image forming apparatus according to claim 10, wherein the charging unit positively charges the surface of the photosensitive member.

12. The image forming apparatus according to claim 7, wherein the developing unit is configured to form a color image using at least one of yellow, magenta, and cyan.

13. An image forming apparatus, comprising:
  a photosensitive member comprising a photosensitive layer on a surface thereof;
  an image exposure unit configured to form an electrostatic latent image by exposing the photosensitive member with a light beam having a light energy more than twice as large than a light energy that can cause a surface potential of the uniformly charged photosensitive member to dampen to a half of a potential thereof;
  a gray-level image device configured to transmit a drive signal to the image exposure unit, and to produce a gray-level image in accordance with a gray-level image signal based on image data including gray-level information;
  a developing unit configured to develop an electrostatic latent image formed on the photosensitive member by a positive development process; and
  a transferring unit configured to transfer a developed image from the photosensitive member to a recording medium.

14. The image forming apparatus according to claim 13, wherein the charging unit positively charges the surface of the photosensitive member.

15. The image forming apparatus according to claim 15, wherein the photosensitive member is an inorganic photosensitive member made of amorphous silicon.

16. The image forming apparatus according to claim 13, wherein the developing unit is configured to form a color image using at least one of yellow, magenta, and cyan.

17. The image forming apparatus according to claim 13, wherein the exposure is carried out in the neighborhood or within the saturation range of the photosensitive member.

18. An image forming method for forming a gray-level image by an electrophotographic process, comprising the steps of:
  defining a relationship between a thickness Tp of a photosensitive layer on a photosensitive member and an exposure diameter Db of a light beam as $2Tp < Db$, where the exposure diameter Db is a minimum diameter at $1/e^2$ with respect to a peak value in an exposure distribution determined by integrating an energy distribution of the light beam on the photosensitive member with an exposure time; and
  setting a maximum exposure within the exposure diameter Db of the light beam at a value such that a differential sensitivity of the photosensitive layer of the photosensitive member is sufficiently small in order that a gray-level image will be produced as a result of damping characteristics of the photosensitive member.

19. An image forming method for forming a gray-level image by an electrophotographic process, comprising the steps of:
  defining a relationship between a thickness Tp of a photosensitive layer on a photosensitive layer on a photosensitive member and an exposure diameter Db of a light beam as $2Tp < Db$, where the exposure diameter Db is a minimum diameter at $1/e^2$ with respect to a peak value in an exposure distribution determined by integrating an energy distribution of the light beam on the photosensitive member with an exposure time; and
  setting a maximum exposure within the exposure diameter Db at a value that makes a differential sensitivity of the photosensitive layer a third of a maximum value of the differential sensitivity or smaller.

* * * * *